US006741722B2

(12) United States Patent
Abe

(10) Patent No.: US 6,741,722 B2
(45) Date of Patent: May 25, 2004

(54) VERIFICATION DATA ENCODING METHOD, ORIGINAL IMAGE VERIFICATION METHOD AND APPARATUS, AND COMPUTER READABLE MEDIUM

(75) Inventor: Yasushi Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 546 days.

(21) Appl. No.: 09/745,545

(22) Filed: Dec. 26, 2000

(65) Prior Publication Data

US 2001/0040978 A1 Nov. 15, 2001

(30) Foreign Application Priority Data

Dec. 27, 1999 (JP) .............................. 11-369697

(51) Int. Cl.$^7$ .............................. G06K 9/00; H04L 9/00
(52) U.S. Cl. ........................................ 382/100; 713/176
(58) Field of Search ........................ 382/100; 713/176; 358/3.28; 348/463; 380/201–204; 370/527, 529; 725/20; 375/130

(56) References Cited

U.S. PATENT DOCUMENTS 5,664,018 A * 9/1997 Leighton .................... 713/176
5,822,432 A * 10/1998 Moskowitz et al. .......... 380/28
6,557,103 B1 * 4/2003 Boncelet et al. ............ 713/176

FOREIGN PATENT DOCUMENTS

EP 0953938 A2 * 3/1999 ............ G06T/1/00
JP 11-098344 4/1999

OTHER PUBLICATIONS

"Data Hiding in Images with Adaptive Numbers of Least Significant Bits based on the Human Visual System" by Wen–Nung Lie et al. International Conference on Image Processing, Oct. 28, 1999.*
A Digital Watermark by Tirkel et al., IEE International conference on Image Processing, Nov. 16, 1994.*

* cited by examiner

Primary Examiner—Mehrdad Dastouri
(74) Attorney, Agent, or Firm—Oblon, Spivak, McClelland, Maier & Neustadt, P.C.

(57) ABSTRACT

In a verification data encoding method of the invention, a verification data is provided for each of a plurality of pixels of a digital image, in order for determining whether an alteration to the digital image is effected. The verification data is inserted to each of the plurality of pixels of the digital image such that the verification data is invisible. In an original image verification method and apparatus of the invention, a key information is input and a pseudo-random code is provided by taking the pseudo-random code from a sequence of pseudo-random codes initialized by the key information. A verification data is calculated through a predetermined operation based on a pixel value indicated by a predetermined number of bits of the pixel of concern in an input digital image and based on the pseudo-random code. Then, it is determined whether a value of the verification data matches with a value of the pixel of concern in the input digital image, in order to determine whether an alteration to an original digital image is effected, based on a result of the determination.

11 Claims, 5 Drawing Sheets

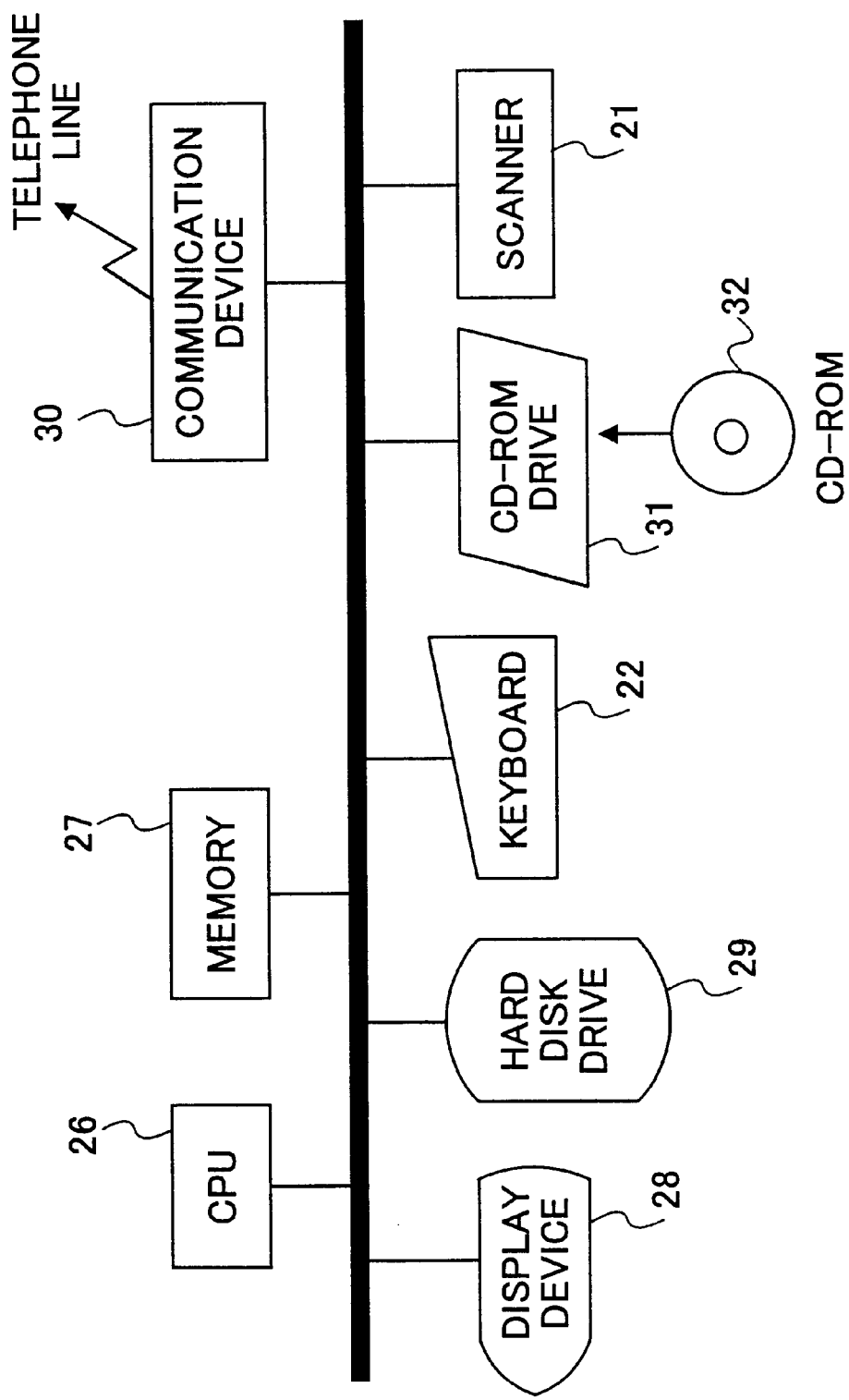

VERIFICATION DATA ENCODING METHOD, ORIGINAL IMAGE VERIFICATION METHOD AND APPARATUS, AND COMPUTER READABLE MEDIUM

BACKGROUND OF THE INVENTION

1. Field of the Invention

The present invention relates to a method of encoding a digital image with a verification data, and relates to a method and apparatus for decoding an encoded image to determine whether an alteration to the original image is effected in accordance with the results of the decoding. Further, the present invention relates to a computer readable medium storing program codes causing a processor to perform the decoding of the encoded image.

The technique for performing the decoding of an encoded image promises to play an important role in several fields, for example, the protection of confidential images and other intellectual property, distributed to the consumers, which helps prevent illegal alteration or intentional corruption of the original image.

2. Description of the Related Art

In recent years, with the advent of digitization of images and digital image distribution by using digital cameras or scanners, there are trends to substitute digital images for photographic images. Copyright protection of such digital images has become a substantial issue for image publishers and authors. For this reason, there is an increasing demand for establishing the technique for ensuring the copyright protection and distinguishing, from the real original image, forged images or the like that may be intentionally corrupted, illegally altered, or distributed via transmission channels by the third party.

One technique used to identify digital image ownership is a digital signature. Generally, in the digital signature technique, the signature information is produced from the data to be verified. This signature information is recorded onto a portion of an image file or another file as its attachment. Upon verification, the signature information is reproduced from the image data, the reproduced information is compared with the recorded signature information, and it is determined whether the image data is the real original image based on the result of the comparison.

However, the digital signature technique requires recording the signature information onto an image file as its attachment, and only a special file format can be used for this purpose. Further, the digital signature technique may be used only to determine whether the image data is the real original image, but it may not be used to identify which portion of the image is altered from the original image when the image is determined as not the original image.

Another technique used to identify digital image ownership is a digital watermark that is encoded or embedded into an image or image sequence. Such watermarks must be secure, robust to intentional corruption and to compression processing, and not unreasonably complex to encode and decode. The watermark is generally invisible to a viewer.

Japanese Laid-Open Patent Application No.11-98344 discloses a technique for detecting illegal alteration of a digital image by using electronic watermarking. In the method and apparatus of the above document, an original image and its corresponding watermark are registered into a management device. A synthetic image that is suspected to be an illegal alteration of the original image is compared with the original image registered in the management device to calculate a difference between the suspected image and the original image. A watermark is extracted from the calculated difference. The extracted watermark is compared with the watermark registered in the management device. When a match does not occur, it is determined that an alteration to the original image is effected in the suspected image.

However, the watermarking technique of the above document requires registering the original image and the watermark into the management device, and it is difficult to put the method of the above document into practical use.

SUMMARY OF THE INVENTION

An object of the present invention is to provide a verification data encoding method that effectively verifies the identification of digital image ownership without limiting the type of the digital image.

Another object of the present invention is to provide an original image verification method for determining whether an alteration to the original image is effected based on the result of decoding of an encoded image, which method effectively verifies the identification of digital image ownership and simply identifies which location of the image is altered from the original image when the image is determined as being altered from the original image.

Another object of the present invention is to provide an original image verification apparatus for determining whether an alteration to the original image is effected based on the result of decoding of an encoded image, which apparatus effectively verifies the identification of digital image ownership and simply identifies which location of the image is altered from the original image when the image is determined as being altered from the original image.

Another object of the present invention is to provide a computer readable medium storing program code instructions causing a computer to execute the original image verification method, which effectively verifies the identification of digital image ownership and simply identifies which location of the image is altered from the original image when the image is determined as being altered from the original image.

The above-mentioned objects of the present invention are achieved by a method of encoding a digital image with a verification data, the digital image containing a plurality of pixels, the method comprising the steps of: providing a verification data for each of the plurality of pixels, in order for determining whether an alteration to the digital image is effected; and inserting the verification data to each of the plurality of pixels of the digital image such that the verification data is invisible.

The above-mentioned objects of the present invention are achieved by an original image verification method for determining whether an alteration to an original digital image is effected based on a result of decoding of an input digital image, the input digital image containing a plurality of pixels, the method comprising the steps of: inputting a key information; providing a pseudo-random code by taking the pseudo-random code from a sequence of pseudo-random codes initialized by the key information; calculating a verification data through a predetermined operation based on a pixel value indicated by a predetermined number of bits of the pixel of concern in the input digital image and based on the pseudo-random code; and determining whether a value of the verification data matches with a value of the pixel of concern in the input digital image, in order to determine whether an alteration to the original digital image is effected, based on a result of the determination.

The above-mentioned objects of the present invention are achieved by an original image verification apparatus for determining whether an alteration to an original image is effected based on a decoding result, the apparatus comprising: a key input unit which inputs a key information; a pseudo-random code generator which provides a pseudo-random code by taking one of pseudo-random codes in a sequence initialized by the key information; a verification data calculation unit which calculates a verification data through a predetermined operation based on a pixel value indicated by a predetermined number of bits of the pixel of concern in the input digital image and based on the pseudo-random code; and a determination unit which determines whether a value of the verification data matches with a value of the pixel of concern in the input digital image, in order to determine whether an alteration to the original digital image is effected, based on a result of the determination.

The above-mentioned objects of the present invention are achieved by a computer readable medium storing a program of code instructions executable by a computer to perform an original image verification method to determine whether an alteration to an original digital image is effected, based on a result of decoding of an input digital image, the original image verification method comprising the steps of: inputting a key information; providing a pseudo-random code by taking the pseudo-random code from a sequence of pseudo-random codes initialized by the key information; calculating a verification data through a predetermined operation based on a pixel value indicated by a predetermined number of bits of the pixel of concern in the input digital image and based on the pseudo-random code; and determining whether a value of the verification data matches with a value of the pixel of concern in the input digital image, in order to determine whether an alteration to the original digital image is effected, based on a result of the determination.

In the verification data encoding method of the present invention, the verification data, provided for determining whether an alteration to the original image is effected, is inserted to each of the plurality of pixels of the image in such a manner that the verification data is invisible. Accordingly, the verification data encoding method of the present invention is effective in verifying the identification of digital image ownership without limiting the type of the digital image. Further, the original image verification method and apparatus of the present invention are effective in verifying the identification of digital image ownership, and make it possible to simply identify which location of the image is altered from the original image when the image is determined as being altered from the original image. It is not necessary to register the original image and the verification data in a memory of a system that performs the original image verification. The original image verification method and apparatus of the present invention do not depend on a special file format as in the conventional digital signature technique.

BRIEF DESCRIPTION OF THE DRAWINGS

Other objects, features and advantages of the present invention will be apparent from the following detailed description when read in conjunction with the accompanying drawings in which:

FIG. 5 is a block diagram of a computer system in which the original image verification apparatus of the invention is embodied by using a computer readable medium storing the program code instructions thereof.

DETAILED DESCRIPTION OF PREFERRED EMBODIMENTS

A description will now be provided of preferred embodiments of the present invention with reference to the accompanying drawings.

Figure 1:
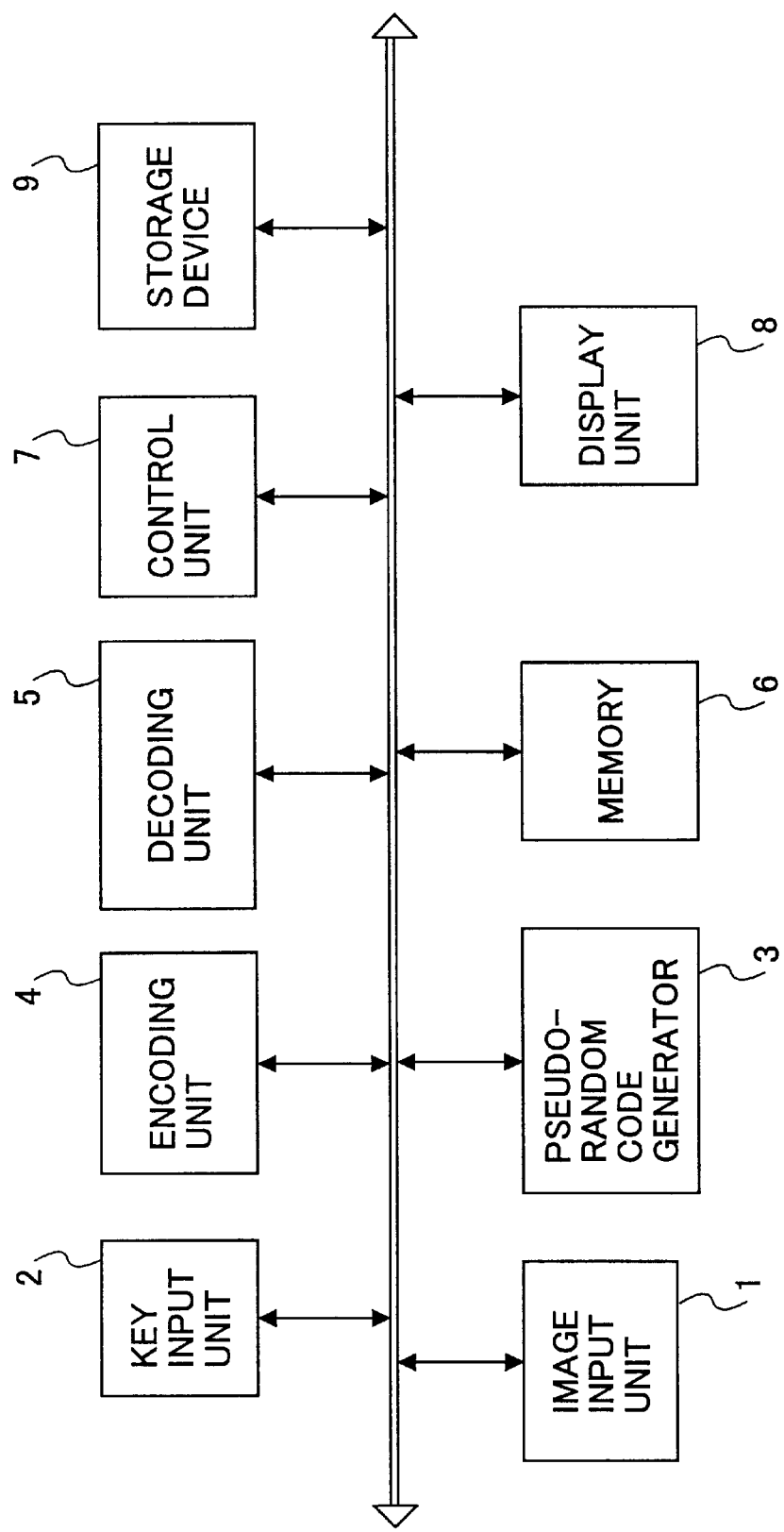
FIG. 1 is a block diagram of an image processing system in which the verification data encoding method and the original image verification method and apparatus of the present invention are embodied.

FIG. 1 shows an image processing system in which the verification data encoding method and the original image verification method of the present invention are embodied.

The verification data encoding method of the invention is applicable to any types of digital images, including two-level images, multiple-level images, color images and moving pictures, and it does not depend on a specific type of digital images. However, for the purpose of description, the image processing system of FIG. 1 operates upon a multiple-level image that contains a plurality of pixels, each pixel having a pixel value represented by 8 bits of image data.

In the image processing system of FIG. 1, an image input unit 1, a key input unit 2, a pseudo-random code generator 3, an encoding unit 4, a decoding unit 5, a memory 6, a control unit 7, a display unit 8, and a storage device 8 are provided. The image input unit 1 is provided to capture a digital image into the system. The key input unit 2 is provided to input a key information to the system. The pseudo-random code generator 3 provides the system with a pseudo-randomly generated code.

In the image processing system of FIG. 1, the encoding unit 4 is provided to encode the digital image with a verification data in order to produce an encoded image with the verification data. The decoding unit 5 is provided to recover an encoded image with the verification data in order to determine whether an alteration to the original image is effected, based on the decoding results. The memory 6 is provided to store the digital image data, the image processing results and others that are used when performing the verification data encoding process or the original image verification process. The control unit 7 controls the respective elements of the image processing system. The control unit 7 generally comprises a microprocessor.

Further, in the image processing system of FIG. 1, the display unit 8 is provided to display the digital image or the operational messages, needed for verification data encoding process or the original image verification process, on the display monitor in a visible form. The storage device 8 contains an information storage medium (e.g., an optical disk), which is inserted into the storage device 8, and the storage device 8 allows the user to read information from the storage medium and to store information onto the storage medium.

Figure 2:
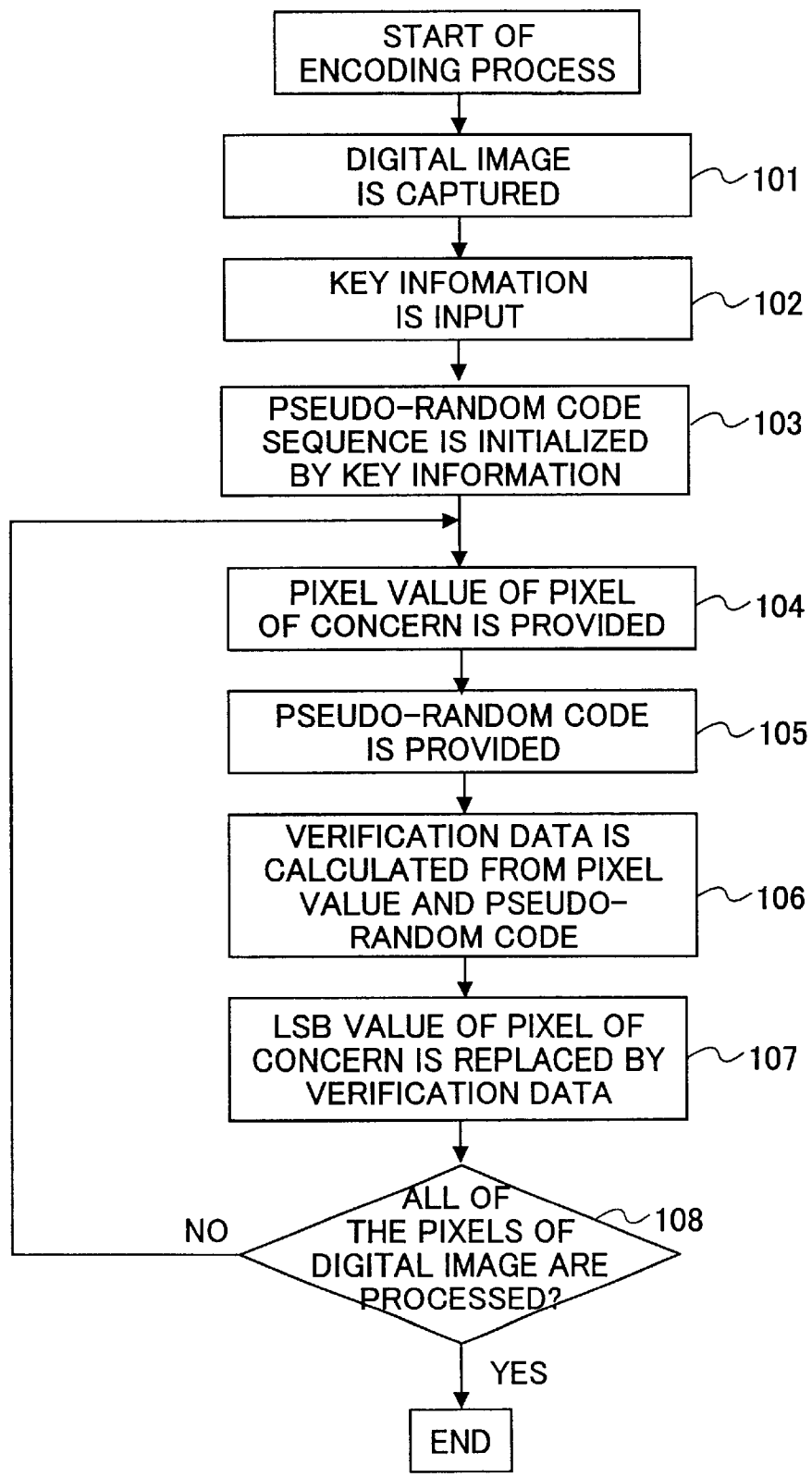
FIG. 2 is a flowchart for explaining one preferred embodiment of the verification data encoding method of the invention.

FIG. 2 is a flowchart for explaining one preferred embodiment of the verification data encoding method of the invention. Specifically, FIG. 2 shows a verification data encoding process that is executed by the control unit 7 of the image processing system of FIG. 1.

As shown in FIG. 2, at a start of the verification data encoding process, the control unit 7 at step 101 controls the image input unit 1 to capture a digital image into the system. The digital image contains a plurality of pixels, each pixel having a pixel value represented by 8 bits of image data.

The control unit 7 at step 102 controls the key input unit 2 to input a key information to the system. The control unit 7 at step 103 initializes the pseudo-random code generator 3 with the key information supplied by the key input unit 2 at the step 102. Namely, a sequence of pseudo-random codes produced by the pseudo-random code generator 3 is initialized by using the key information.

After the step 103 is performed, the control unit 7 at step 104 controls the encoding unit 4 to provide a pixel value (indicated by 8 bits of image data) of the pixel of concern by sequentially taking one of the plurality of pixels in the input digital image. The control unit 7 at step 105 controls the pseudo-random code generator 3 to provide a pseudo-random code by taking one of the pseudo-random codes in the sequence initialized by using the key information.

After the step 105 is performed, the control unit 7 at step 106 calculates a verification data through a predetermined arithmetic operation based on the seven most significant bits of the pixel of concern provided at the step 104 and the pseudo-random code provided at the step 105.

After the step 106 is performed, the control unit 7 at step 107 replaces a value of the least significant bit (LSB) of the pixel of concern by a value of the verification data calculated at the step 106. Namely, the control unit 7 at the step 107 inserts or embeds the verification data into the LSB of the pixel of concern in the digital image so that the pixel of concern in the digital image is encoded with the verification data.

Figure 3:
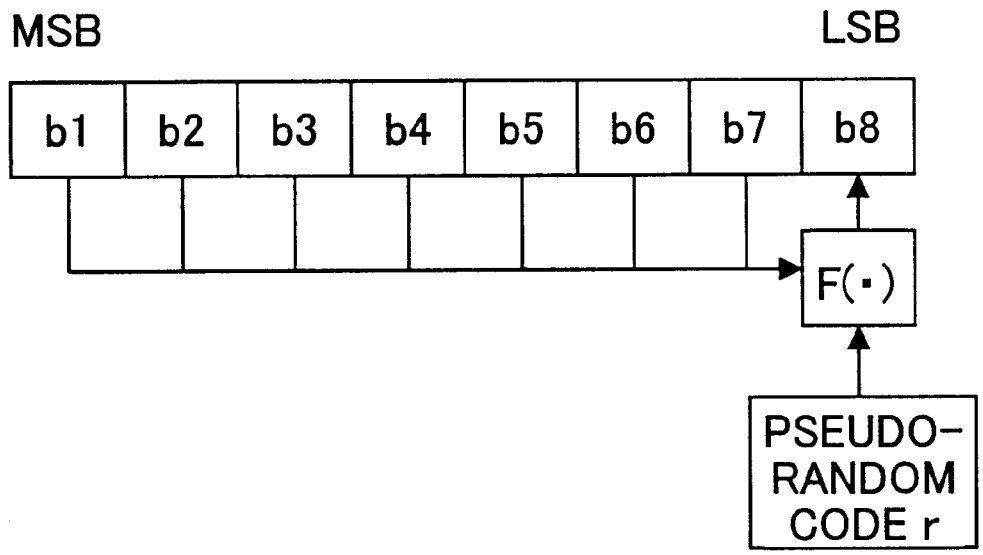
FIG. 3 is a diagram for explaining the insertion of verification data into a digital image in the verification data encoding method of FIG. 2.

FIG. 3 is a diagram for explaining the insertion of verification data into a digital image in the verification data encoding method of FIG. 2. Specifically, FIG. 3 shows the calculation of a verification data and the insertion of the calculated verification data into the pixel of concern in the digital image.

As shown in FIG. 3, the pixel of concern, taken from the digital image, has a pixel value represented by 8 bits of image data, and these eight bits are respectively indicated by "b1" through "b8". The "b1" bit is the most significant bit (MSB) of the pixel of concern, and the "b8" bit is the least significant bit (LSB) of the pixel of concern. The control unit 7 calculates a verification data (1 bit) through a predetermined arithmetic operation "F(·)" (which is, in the present embodiment, exclusive-OR) based on the seven most significant bits "b1" through "b7" of the pixel of concern and the one-bit pseudo-random code "r". After this calculation is performed, the control unit 7 replaces a value of the LSB "b8" of the pixel of concern by a value of the calculated verification data.

In the example of FIG. 3, the pseudo-random code "r" is indicated by 1 bit of information taken from a sequence of pseudo-random codes produced by the pseudo-random code generator 3. Alternatively, the pseudo-random code "r" may be indicated by an arbitrary number of bits of information.

In the example of FIG. 3, the one-bit verification data is calculated through an exclusive-OR operation "F(·)" based on the seven most significant bits "b1" through "b7" of the pixel of concern and the one-bit pseudo-random code "r". For example, the calculation of the verification data is performed through the exclusive-OR operation as follows:

c1=b1^b2, c2=c1^b3, c3=c2^b4, c4=c3^b5, c5=c4^b6, c6=c5^b7, c7=c6^r, b8=c7 where "^" denotes an exclusive-OR operation, "c1" through "c6" denote intermediate values in the calculation of the verification data, and "c7" denotes the verification data. And the last formula b8=c7 indicates the insertion of the verification data "c7" into the LSB "b8" of the pixel of concern.

Alternatively, the calculation of the verification data and the insertion of the verification data into the LSB of the pixel of concern may be expressed as follows.

$$b8=((((((b1\hat{\ }b2)\hat{\ }b3)\hat{\ }b4)\hat{\ }b5)\hat{\ }b6)\hat{\ }b7)\hat{\ }r)$$

In the case in which the pseudo-random code "r" is indicated by a number of bits of information, it is necessary to repeat the execution of the exclusive-OR operation for all of the bits of the pseudo-random code "r".

In the example of FIG. 3, the verification data is calculated based on the seven most significant bits "b1" through "b7" of the pixel of concern. However, the present invention is not limited to this embodiment. Alternatively, arbitrarily selected ones of the high-end bits of the pixel of concern may be used to perform the calculation of the verification data. In such alternative embodiment, it is preferred to pseudo-randomly change the positions of the selected bits of the pixel of concern, rather than always using the fixed positions of the bits of the pixel of concern. According to such alternative embodiment, it is possible to increase the security against illegal alteration of the original image.

In the example of FIG. 3, the exclusive-OR operation is used for the calculation of the verification data. However, the present invention is not limited to this embodiment, and variations and modifications may be made. For example, the least significant bit of a sum of all the bits of the pixel of concern may be used instead. A known parity checking may be used instead, in which the parity bit is assumed for each bit of the pixel of concern so that all bits of the pixel have either an odd number or an even number of set bits. Further, the positions of the selected bits of the pixel of concern for the calculation of the verification data may be pseudo-randomly changed.

Referring back to FIG. 2, after the step 107 is performed, the control unit 7 at step 108 determines whether all of the pixels of the digital image are processed through the above steps 104 to 107. When the result at the step 108 is negative, the next one of the plurality of pixels in the input digital image is taken as the pixel of concern, and the control of the control unit 7 is transferred to the above step 104. On the other hand, when the result at the step 108 is affirmative, the verification data encoding process of FIG. 2 ends.

As described above, the verification data, provided for determining whether an alteration to the original image is effected, is inserted to each of the plurality of pixels of the image in such a manner that the verification data is invisible. Accordingly, the verification data encoding method of the present embodiment is effective in verifying the identification of digital image ownership without limiting the type of the digital image.

It should be noted that, unless the quality of the digital image is degraded, the position of the bit in the pixel of concern where the verification data is inserted may be different from the LSB of the pixel, and the number of bits of the verification data may be plural bits instead of a single bit.

Figure 4:
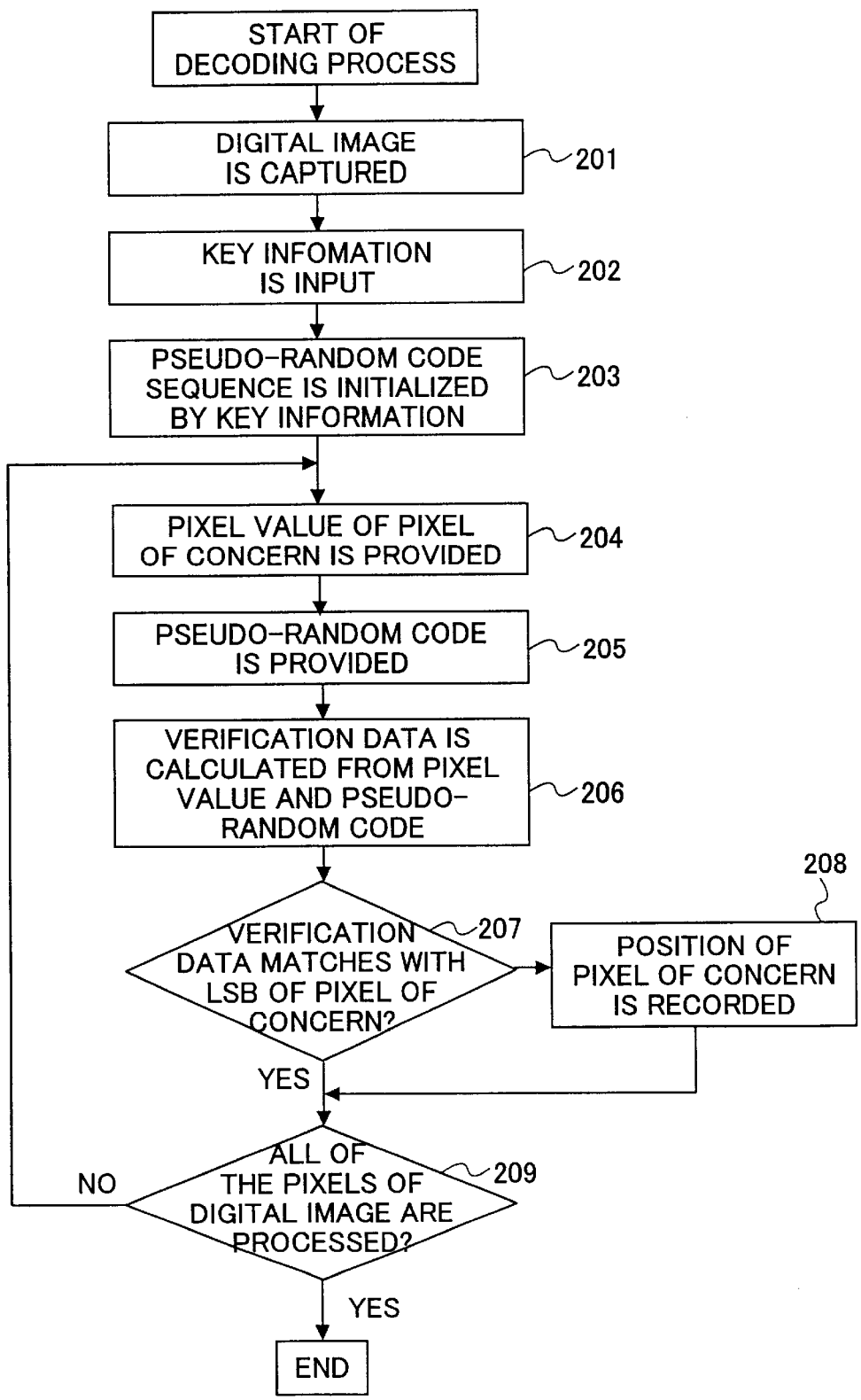
FIG. 4 is a flowchart for explaining one preferred embodiment of the original image verification method and apparatus of the invention.

FIG. 4 is a flowchart for explaining one preferred embodiment of the original image verification method of the invention. Specifically, FIG. 4 shows a verification data decoding process that is executed by the control unit 7 of the image processing system of FIG. 1.

As shown in FIG. 4, at a start of the verification data decoding process, the control unit 7 at step 201 controls the image input unit 1 to capture a digital image into the system. Typically, this digital image is an encoded image that is produced from the original digital image through the encoding process of FIG. 2. The digital image contains a plurality of pixels, each pixel having a pixel value represented by 8 bits of image data.

The control unit 7 at step 202 controls the key input unit 2 to input a key information to the system. The control unit 7 at step 203 initializes the pseudo-random code generator 3 with the key information supplied by the key input unit 2 at the step 202. Namely, a sequence of pseudo-random codes produced by the pseudo-random code generator 3 is initialized by using the key information.

If this key information is exactly the same as that supplied by the key input unit 2 at the step 102 in the encoding process of FIG. 2, the pseudo-random code sequence produced by the pseudo-random code generator 3 is exactly the same as that produced during the encoding process of FIG. 2. Otherwise, the resulting the pseudo-random code sequence in the decoding process is not the same as that produced during the encoding process.

After the step 203 is performed, the control unit 7 at step 204 controls the decoding unit 5 to provide a pixel value (indicated by 8 bits of image data) of the pixel of concern by sequentially taking one of the plurality of pixels in the input digital image. The control unit 7 at step 205 controls the pseudo-random code generator 3 to provide a pseudo-random code by taking one of the pseudo-random codes in the sequence initialized by using the key information.

After the step 205 is performed, the control unit 7 at step 206 calculates a verification data through a predetermined arithmetic operation based on the seven most significant bits of the pixel of concern provided at the step 204 and the pseudo-random code provided at the step 205. In the present embodiment, the arithmetic operation, used in the step 206, is the exclusive-OR operation that is the same as that during the encoding process of FIG. 2.

After the step 206 is performed, the control unit 7 at step 207 determines whether a value of the verification data calculated at the step 206 matches with a value of the least significant bit (LSB) of the pixel of concern in the input digital image. Namely, in the step 207, the verification data is compared with the LSB of the pixel of concern in the input digital image, in order to determine whether an alteration to the original digital image is effected, based on the comparison result.

When the result at the step 207 is affirmative, it is determined that the value of the verification data matches with the value of the LSB of the pixel of concern. In this case, the control of the control unit 7 is transferred to a next step 209.

When the result at the step 207 is negative, it is determined that the value of the verification data does not match with the value of the LSB of the pixel of concern. In this case, the control of the control unit 7 is transferred to a next step 208.

The control unit 7 at step 208 determines that an alteration to the pixel of concern in the original digital image is effected, and records the position of the pixel of concern of the digital image onto either the memory 6 or the storage medium of the storage device 9. In the present embodiment, even when the step 208 is performed at only one cycle during the decoding process for all of the pixels of the input digital image, the control unit 7 at the step 208 determines that an alteration to the original digital image is effected.

The control unit 7 at step 209 determines whether all of the pixels of the input digital image are processed through the above steps 204 to 207. When the result at the step 209 is negative, the next one of the plurality of pixels in the input digital image is taken as the pixel of concern, and the control of the control unit 7 is transferred to the above step 204. On the other hand, when the result at the step 209 is affirmative, the original image verification process of FIG. 4 ends.

As described above, the original image verification method and apparatus of the present embodiment are effective in verifying the identification of digital image ownership, and make it possible to simply identify which location of the image is altered from the original image when the image is determined as being altered from the original image. It is not necessary to register the original image and the verification data in the memory of the system that performs the original image verification. The original image verification method and apparatus of the present embodiment do not depend on a special file format as in the conventional digital signature technique.

The configuration of the above image processing system of FIG. 1 is an example wherein both the verification data encoding method and the original image verification method of the invention are embodied. Alternatively, the image processing system may be divided into two separate modules: a transmitter module having an encoder and a receiver module having a decoder. In such alternative embodiment, the transmitter module and the receiver module are connected together via a communication line, and an encoded image, produced from the original image at the encoder, is transmitted from the transmitter module to the decoder of the receiver module via the communication line. The decoder of the receiver module may perform the original image verification process of FIG. 4 for an encoded image, in order to determine whether an alteration to the original image is effected.

In such alternative embodiment, the encoder of the transmitter module generally comprises the image input unit 1, the key input unit 2, the pseudo-random code generator 3, the encoding unit 4, the memory 6, the control unit 7, the display unit 8 and the storage device 9, while the decoder of the receiver module generally comprises the image input unit 1, the key input unit 2, the pseudo-random code generator 3, the decoding unit 5, the memory 6, the control unit 7, the display unit 8 and the storage device 9.

Next, FIG. 5 is a block diagram of a computer system in which the original image verification apparatus of the invention is embodied by using a computer readable medium storing the program code instructions.

As shown in FIG. 5, a CD-ROM 32 that stores a program of code instructions causing a computer to execute the original image verification method of the invention is provided as the computer readable medium. In the computer system of FIG. 5, a scanner 21, a keyboard 22, a CPU (central processing unit) 26, a memory 27, a display device 28, a hard disk drive 29, a communication device 30 and a CD-ROM drive 31 are provided.

In the computer system of FIG. 5, the program code instructions, stored in the CD-ROM 32, is loaded from the CD-ROM drive 31 into the recording medium of the hard disk drive 29. The scanner 21 is provided to capture a digital image into the system. The keyboard 22 is provided to input the key information to the system. A pseudo-random code generating software (not shown) is provided in the recording medium of the hard disk drive 29, and this software provides the system with a pseudo-randomly generated code.

In the computer system of FIG. 5, a decoder software (not shown) is provided in the recording medium of the hard disk drive 29 to recover an encoded image with the verification data in order to determine whether an alteration to the original image is effected, based on the decoding results. The memory 27 is provided to store the digital image data, the image processing results and others that are used when performing the original image verification process. The CPU 26 controls the respective elements of the computer system.

Similar to the image processing system of FIG. 1, the computer system of FIG. 5 is configured to recover an encoded image with the verification data, in order to determine whether an alteration to the original image is effected, based on the decoding results. When the verification data derived through the original image verification process does not match with the LSB of the pixel of concern, it is determined that an alteration to the original image is effected. When a match between the verification data and the LSB of the pixel of concern takes place, it is determined that no alteration to the original image is effected.

Further, in the computer system of FIG. 5, the communication device 30 is provided to receive a digital image from or transmit a digital image to another remote system via a telephone line.

Alternatively, an encoder software (not shown) may be provided in the recording medium of the hard disk drive 29 to perform the verification data encoding process of the invention to produce an encoded data with the verification data, and such encoded image may be transmitted from the communication device 30 to another remote system via the telephone line.

The present invention is not limited to the above-described embodiments, and variations and modifications may be made without departing from the scope of the present invention.

Further, the present invention is based on Japanese priority application No.11-369697, filed on Dec. 27, 1999, the entire contents of which are hereby incorporated by reference.

What is claimed is:

1. A method of encoding a digital image with a verification data, the digital image containing a plurality of pixels, comprising the steps of:
   providing a verification data for each of the plurality of pixels, in order for determining whether an alteration to the digital image is effected, wherein the verification data is calculated, for each of the plurality of pixels, through a predetermined operation based on a pixel value indicated by a predetermined number of bits of the pixel of concern and based on a pseudo-random code; and
   inserting the verification data to each of the plurality of pixels of the digital image such that the verification data is imperceptible to the human visual system.

2. The method according to claim 1, wherein, in said inserting step, the verification data is inserted to a selected bit in a number of bits of each of the plurality of pixels in the digital image, a position of the selected bit in the number of bits of each pixel being predetermined.

3. The method according to claim 1, wherein all of the plurality of pixels of the digital image, after the inserting step is performed, respectively contain the verification data provided in the providing step.

4. The method according to claim 1, further comprising the step of inputting a key information prior to said providing step, the key information being provided to initialize a sequence of pseudo-random codes, wherein, in said providing step, one of the pseudo-random codes in the sequence is taken to calculate the verification data.

5. An original image verification method for determining whether an alteration to an original digital image is effected based on a result of decoding of an input digital image, the input digital image containing a plurality of pixels, comprising the steps of:
   inputting a key information;
   providing a pseudo-random code by taking the pseudo-random code from a sequence of pseudo-random codes initialized by the key information;
   calculating a verification data through a predetermined operation based on a pixel value indicated by a predetermined number of bits of the pixel of concern in the input digital image and based on the pseudo-random code; and
   determining whether a value of the verification data matches with a value of the pixel of concern in the input digital image, in order to determine whether an alteration to the original digital image is effected, based on a result of the determination.

6. The method according to claim 5, wherein said providing step, said calculating step and said determining step are repeatedly performed for all of the plurality of pixels of the input digital image.

7. An original image verification apparatus for determining whether an alteration to an original image is effected based on a decoding result, comprising:
   a key input unit for inputting a key information;
   a pseudo-random code generator for providing a pseudo-random code by taking one of pseudo-random codes in a sequence initialized by the key information;
   a verification data calculation unit for calculating a verification data through a predetermined operation based on a pixel value indicated by a predetermined number of bits of the pixel of concern in the input digital image and based on the pseudo-random code; and
   a determination unit for determining whether a value of the verification data matches with a value of the pixel of concern in the input digital image, in order to determine whether an alteration to the original digital image is effected, based on a result of the determination.

8. The apparatus according to claim 7, wherein said pseudo-random code generator, said verification data calculation unit and said determination unit are controlled to repeatedly perform the determination as to whether the value of the verification data matches with the value of the pixel of concern, for all of the plurality of pixels in the input digital image.

9. A computer readable medium storing a program of code instructions executable by a computer to perform an original image verification method to determine whether an alteration to an original image is effected, based on a result of decoding of an encoded image, the original image verification method comprising the steps of:
   inputting a key information;
   providing a pseudo-random code by taking the pseudo-random code from a sequence of pseudo-random codes initialized by the key information;
   calculating a verification data through a predetermined operation based on a pixel value indicated by a predetermined number of bits of the pixel of concern in the input digital image and based on the pseudo-random code; and
   determining whether a value of the verification data matches with a value of the pixel of concern in the input digital image, in order to determine whether an alteration to the original digital image is effected, based on a result of the determination.

10. An apparatus for encoding a digital image with a verification data, the digital image containing a plurality of pixels, comprising:

a providing unit providing a verification data for each of the plurality of pixels, in order for determining whether an alteration to the digital image is effected; and an insertion unit inserting the verification data to each of the plurality of pixels of the digital image such that the verification data is imperceptible to the human visual system, wherein, in said providing unit, the verification data is calculated, for each of the plurality of pixels, through a predetermined operation based on a pixel value indicated by a predetermined number of bits of the pixel of concern and based on a pseudo-random code.

11. A computer-readable storage medium storing a program of code instructions executable by a computer to perform a method of encoding a digital image with a verification data, the digital image containing a plurality of pixels, the method comprising the steps of:

providing a verification data for each of the plurality of pixels, in order for determining whether an alteration to the digital image is effected; and inserting the verification data to each of the plurality of pixels of the digital image such that the verification data is imperceptible to the human visual system, wherein, in said providing step, the verification data is calculated, for each of the plurality of pixels, through a predetermined operation based on a pixel value indicated by a predetermined number of bits of the pixel of concern and based on a pseudo-random code.

* * * * *